(12) United States Patent
MacDonald et al.

(10) Patent No.: US 8,530,045 B2
(45) Date of Patent: Sep. 10, 2013

(54) BRITTLE POLYMERIC FILM AND TAMPER EVIDENT LABELS MADE THEREFROM

(75) Inventors: William Alasdair MacDonald, Cleveland (GB); Pierre Georges Osborne Moussalli, Cleveland (GB); Kenneth Evans, Cleveland (GB); Julian Peter Attard, North Yorkshire (GB); David Boyce, Cleveland (GB); Christopher Charles Naylor, Warwickshire (GB); Brian John Farmer, legal representative, Staffordshire (GB); David Edward Robins, legal representative, Cambridgeshire (GB)

(73) Assignee: DuPont Teijin Films U.S. Ltd.

( * ) Notice: Subject to any disclaimer, the term of this patent is extended or adjusted under 35 U.S.C. 154(b) by 0 days.

(21) Appl. No.: 12/710,858
(22) Filed: Feb. 23, 2010
(65) Prior Publication Data
US 2010/0212804 A1 Aug. 26, 2010

Related U.S. Application Data

(62) Division of application No. 10/496,733, filed as application No. PCT/GB02/05511 on Dec. 6, 2002, now Pat. No. 7,718,104.

(30) Foreign Application Priority Data

Dec. 12, 2001 (GB) .................................. 0129728.2

(51) Int. Cl.
| B32B 7/04 | (2006.01) |
| B32B 27/08 | (2006.01) |
| B32B 27/36 | (2006.01) |
| C08G 63/16 | (2006.01) |
| C08G 63/18 | (2006.01) |
| C08G 63/181 | (2006.01) |
| C08G 63/183 | (2006.01) |
| C08G 63/688 | (2006.01) |
| B65D 50/00 | (2006.01) |
| B65D 55/06 | (2006.01) |
| B65C 1/00 | (2006.01) |
| B65C 3/00 | (2006.01) |

(52) U.S. Cl.
USPC ........... 428/346; 428/343; 428/347; 428/349; 428/480; 428/915; 528/302; 528/305; 528/308; 528/308.6

(58) Field of Classification Search
None
See application file for complete search history.

(56) References Cited

U.S. PATENT DOCUMENTS
2,968,067 A 1/1961 Long
(Continued)

FOREIGN PATENT DOCUMENTS
DE 100 22 437 * 11/2001
(Continued)

OTHER PUBLICATIONS
Walli, K. and Natus, G.; "International Preliminary Examination Report"; Mar. 12, 2004; 5 pp; European Patent Office, Munich, DE.

*Primary Examiner* — Vivian Chen
(74) *Attorney, Agent, or Firm* — RatnerPrestia

(57) ABSTRACT

A process for the production of a polymeric film comprising a copolyester having an acid component and a diol component, said acid component comprising a dicarboxylic acid and a sulfomonomer containing a sulfonate group attached to the aromatic nucleus of an aromatic dicarboxylic acid, said process comprising the steps of: (i) melt-extruding a layer of said copolyester; (ii) stretching the extrudate in at least one direction; (iii) heat-setting the film by raising the temperature of the stretched film to a temperature $T_1$ in a first heating zone such that $(T_M - T_1)$ is in the range of from 5 to 30° C., and then raising the temperature of the film to a temperature $T_2$ in a second heating zone such that $(T_M - T_2)$ is in the range of from 0 to 10° C., wherein $T_M$ is the peak melting temperature of the polymeric film; wherein $T_2$ is greater than $T_1$; and wherein the times which a transverse section of the film spends in the first and second heating zones are defined by $t_1$ and $t_2$, respectively, such that the ratio of $t_1$ to $t_2$ is at least 2:1; and a polymeric film obtainable thereby having an ultimate tensile strength at destruction in the range of 2 to 15 kgf/mm² in the machine direction and 2.5 to 17 kgf/mm² in the transverse direction.

16 Claims, 1 Drawing Sheet

(56) References Cited

U.S. PATENT DOCUMENTS

| | | | |
|---|---|---|---|
| 3,479,426 A | 11/1969 | De Smedt | |
| 3,563,942 A | 2/1971 | Heiberger | |
| 4,476,189 A * | 10/1984 | Posey et al. | 428/336 |
| 4,493,872 A * | 1/1985 | Funderburk et al. | 428/332 |
| 4,525,419 A * | 6/1985 | Posey et al. | 428/336 |
| 4,539,256 A * | 9/1985 | Shipman | 428/315.5 |
| 4,585,687 A * | 4/1986 | Posey et al. | 428/195.1 |
| 4,605,591 A * | 8/1986 | Nose et al. | 428/332 |
| 4,746,556 A | 5/1988 | Matsuguchi et al. | |
| 4,746,566 A | 5/1988 | Connolly | |
| 4,978,740 A * | 12/1990 | Kawamoto et al. | 528/272 |
| 5,042,842 A | 8/1991 | Green et al. | |
| 5,053,482 A * | 10/1991 | Tietz | 528/272 |
| 5,097,004 A * | 3/1992 | Gallagher et al. | 528/272 |
| 5,097,005 A * | 3/1992 | Tietz | 528/272 |
| 5,171,308 A * | 12/1992 | Gallagher et al. | 604/365 |
| 5,300,572 A * | 4/1994 | Tajima et al. | 525/167 |
| 5,380,587 A * | 1/1995 | Musclow et al. | 428/353 |
| 5,411,695 A | 5/1995 | Yamada et al. | |
| 5,660,925 A * | 8/1997 | Cooley et al. | 428/304.4 |
| 5,824,394 A | 10/1998 | Kinoshita et al. | |
| 5,906,785 A | 5/1999 | Fujii et al. | |
| 6,018,004 A * | 1/2000 | Warzelhan et al. | 525/440.08 |
| 6,214,440 B1 | 4/2001 | Peiffer et al. | |
| 6,368,710 B1 * | 4/2002 | Hayes | 428/364 |
| 6,409,958 B1 | 6/2002 | Hosono et al. | |
| 6,436,531 B1 * | 8/2002 | Kollaja et al. | 428/355 R |
| 6,607,823 B2 * | 8/2003 | Posey et al. | 428/336 |
| 6,824,849 B2 * | 11/2004 | Herzog et al. | 428/40.1 |
| 7,056,573 B2 * | 6/2006 | Murschall et al. | 428/212 |

FOREIGN PATENT DOCUMENTS

| | | |
|---|---|---|
| EP | 0185470 | 6/1986 |
| EP | 0348062 | 12/1989 |
| EP | 0408197 | 1/1991 |
| EP | 0429179 | 5/1991 |
| EP | 0644226 | 3/1995 |
| EP | 0874015 | 10/1998 |
| GB | 838708 | 6/1960 |
| JP | 58007447 | 1/1983 |
| JP | 61051323 | 3/1986 |
| JP | 63286346 | 11/1988 |
| JP | 63290730 | 11/1988 |
| JP | 1229042 | 9/1989 |
| JP | 2042475 | 2/1990 |
| JP | 4220329 | 8/1992 |
| JP | 4248843 | 9/1992 |
| JP | 6145376 | 5/1994 |
| JP | 7036149 | 2/1995 |
| JP | 2002-171846 * | 6/2002 |
| WO | WO 96/26840 | 9/1996 |
| WO | WO 97/37849 | 10/1997 |
| WO | WO 98/01291 | 1/1998 |
| WO | WO 03/050168 | 6/2003 |

* cited by examiner

BRITTLE POLYMERIC FILM AND TAMPER EVIDENT LABELS MADE THEREFROM

CROSS REFERENCE TO RELATED APPLICATIONS

This application is a Division of U.S. application Ser. No. 10/496,733, filed May 21, 2004, which is a National Stage filing of PCT Application No. GB02/05511, filed Dec. 6, 2002, which claims priority of GB Application No. 0129728.2, filed Dec. 12, 2001, the entirety of all of which applications are incorporated herein by reference.

FIELD OF THE INVENTION

This invention relates to a brittle polymeric film which may be used as a film for anti-counterfeit or security labels (also known as "tamper-evident" labels).

BACKGROUND OF THE INVENTION

In the manufacture of most polymeric films, it is an object to adjust the composition and process conditions to produce a film which exhibits good mechanical properties such as increased tensile strength, elasticity and tear resistance. However, in certain applications, it is desirable to increase the potential destructibility of the film.

One such application relates to anti-counterfeit, anti-theft, security or "tamper-evident" labels. A particular area of application for such labels is in the packaging of consumer products, such as compact disks, computer software and pharmaceuticals; in "overlaminating" films; and in document protection. Such labels should be sufficiently brittle so that the labels fracture if an attempt is made to remove the label from the object to which it is adhered. A problem for retailers and consumers is the tampering with the packaging of an article. In some cases the packaged materials are altered and repackaged. It is desirable to have a label which would show that the article within the packaging had not been opened and/or altered. A suitably brittle label could indicate when a label or a package containing the label has been altered. This feature prevents the certifying label being removed from a product of guaranteed authenticity and subsequently being re-attached to a counterfeit. It also prevents a protective film from being removed from an underlying document or image so as to tamper with the document or image.

Previous attempts to produce brittle films having a low tear resistance have involved the use of low molecular weight polyesters in the manufacture of the film. However, such films are very susceptible to fracture during the film-forming process.

Acetate films having a low tear resistance have successfully been manufactured but have a tendency to absorb water and are not resistant to solvents such as water.

Polyester films are superior to acetate films in terms of water absorption and water resistance. JP-A-1229042 discloses a readily tearable film comprising a copolyester of ethylene glycol, terephthalic acid, a metal sulphonate group-containing aromatic dicarboxylic acid and either an aliphatic dicarboxylic acid or an aromatic dicarboxylic acid other than terephthalic acid, the film having a tear propagation resistance in at least one direction of 300 g/mm or less.

U.S. Pat. No. 4,746,556 discloses a tamper-evident label comprising a surface layer, an easily breakable layer laminated to the surface layer, a first peel-off layer formed on the surface of the easily breakable layer, a second peel-off layer formed on a part of the main surface of the easily breakable layer, a covering layer and an adhesive layer. The surface layer is peeled off the easily breakable layer and cannot be re-adhered.

U.S. Pat. No. 5,042,842 discloses multi-layer labels, such as those used for preventing or detecting tampering and counterfeiting, which has a base layer with a permanent adhesive coated on a lower surface. Indicia or markings are applied to the bottom surface of the top layer and the top layer is laminated to the upper surface of the base layer. The top layer is laminated to the upper surface of the base layer by permanent patterned adhesive. A portion of each of the upper surface of the base layer and the bottom surface of the top layer are free of adhesive.

WO-A-98/01291 discloses a multi-layer tamper-evident label comprising a first and second layer of polymeric film, wherein the lower surface of the first layer contacts the upper surface of the second layer at a separation interface; a heat-sealable layer wherein the lower surface of the heat-sealable layer is bonded to the upper surface of the first layer; and an adhesive layer wherein the upper surface of the adhesive layer is bonded to lower surface of the second layer.

SUMMARY OF THE INVENTION

It is an object of this invention to provide a film which is brittle while retaining other desirable properties of a conventional PET film, such as a good profile (flatness and consistency across the web) and processability. In particular, it is an object of this invention to provide a film which has a low tensile strength and/or low tear initiation resistance but which is not too brittle to withstand film manufacture and handling (winding etc.).

DETAILED DESCRIPTION OF THE INVENTION

Figure 1:
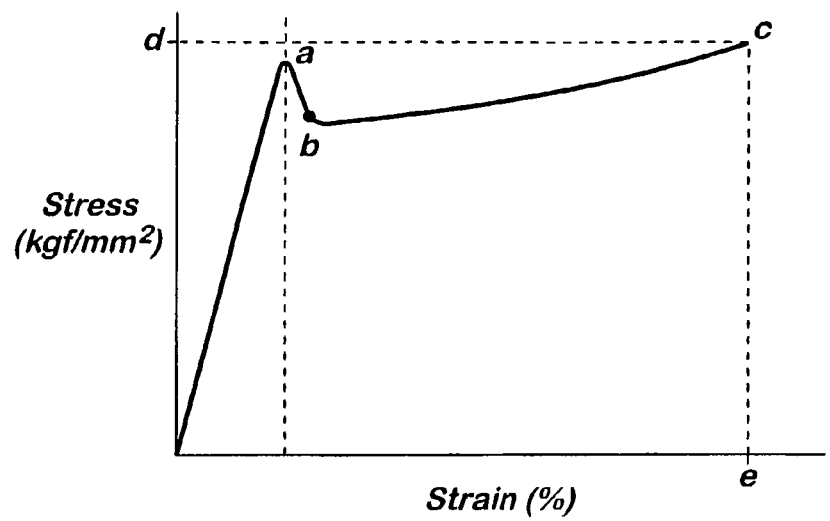
FIG. 1 shows a tensile trace for a standard poly(ethylene terephthalate) (PET) film.

Certain parameters of the polymeric film described herein are defined in terms of the "machine direction" and the "transverse direction", which correspond to the axes of the film production apparatus. The machine direction is the direction of travel along the film production line and corresponds to the lengthways dimension of the film. The transverse direction is the direction orthogonal to the direction of travel of the film during manufacture and corresponds to the widthways dimension of the film.

Accordingly, the present invention provides a polymeric film comprising a copolyester having an acid component and a diol component, said acid component comprising a dicarboxylic acid and a sulfomonomer containing a sulfonate group attached to the aromatic nucleus of an aromatic dicarboxylic acid, wherein said film has an ultimate tensile strength at destruction (UTD), as measured herein, in the range of from about 2 kgf/mm$^2$ to about 15 kgf/mm$^2$ in the machine direction, and from about 2.5 kgf/mm$^2$ to about 17 kgf/mm$^2$ in the transverse direction.

In a preferred embodiment, the sulfomonomer is present in the range of from about 1 to about 10 mol %, preferably in the range of from about 2 to about 10 mol %, and more preferably in the range from about 2 to about 6%, based on the weight of the copolyester.

Preferably, the sulfonate group of the sulfomonomer is a sulfonic acid salt, preferably a sulfonic acid salt of a Group I or Group II metal, preferably lithium, sodium or potassium, more preferably sodium. Ammonium salts may also be used.

The aromatic dicarboxylic acid of the sulfomonomer may be selected from any suitable aromatic dicarboxylic acid, e.g. terephthalic acid, isophthalic acid, phthalic acid, 2,5-, 2,6- or 2,7-naphthalenedicarboxylic acid. However, preferably the aromatic dicarboxylic acid of the sulfomonomer is isophthalic acid. Preferred sulfomonomers are 5-sodium sulpho isophthalic acid and 4-sodium sulpho isophthalic acid.

In one embodiment, the film comprises at least about 95%, and preferably substantially 100% by weight of said copolyester relative to the total amount of polymer in the film.

The polymeric film is a self-supporting film by which is meant a self-supporting structure capable of independent existence in the absence of a supporting base. The thickness of the polyester film may vary over a wide range but preferably is within the range from 1 to 350 µm, more preferably 5 to 100 µm, and especially 12 to 75 µm.

Any suitable dicarboxylic acid, or its lower alkyl (up to 6 carbon atoms) diester, can be used as the dicarboxylic acid component in the present invention, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid such as pivalic acid). One or more dicarboxylic acid(s) can be used, but preferably one dicarboxylic acid is used. Preferably, the dicarboxylic acid is aromatic. Terephthalic acid is the preferred aromatic dicarboxylic acid. In one embodiment, the acid component of the copolyester consists essentially of said dicarboxylic acid and said sulfomonomer containing a sulfonate group attached to the aromatic nucleus of an aromatic dicarboxylic acid.

The diol component may comprise one or more diol(s), but preferably comprises only one diol. The diol component is preferably selected from an aliphatic or cycloaliphatic diols, e.g. ethylene glycol, 1,3-propanediol, 1,4-butanediol, neopentyl glycol and 1,4-cyclohexanedimethanol. An aliphatic diol, particularly ethylene glycol, is preferred.

The polyester film is oriented, for example uniaxially oriented, but more preferably biaxially oriented by drawing in two mutually perpendicular directions in the plane of the film to achieve a satisfactory combination of mechanical and physical properties. Stretching of the film is typically performed at a temperature in the range from 70 to 125° C., for example as described in GB-A-838708. Formation of the film may be effected by any process known in the art for producing an oriented polyester film, for example a tubular or a flat-film process.

In a tubular process, simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat-film process, a film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate first in one direction and then in the other mutually perpendicular direction. Generally, it is preferred to stretch firstly in the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the film-forming polyester, for example polyethylene terephthalate is usually stretched so that the dimension of the oriented film is from 2 to 5 and more preferably 2.5 to 4 times its original dimension in the or each direction of stretching. Greater draw ratios (for example, up to about 8 times) may be used if the film is oriented in only one direction. The film need not be stretched equally in the machine and transverse directions.

The stretched film is dimensionally stabilised by heat-setting under dimensional restraint at a temperature above the glass transition temperature of the film-forming polyester but below the melting temperature thereof. Increasing the temperature of the heat-setting step increases the brittleness of the film. The actual heat set temperature and time will vary depending on the composition of the film but, in general, the heat set temperature is between about 135° to 250° C., typically in the range of from about 190° C. to about 230° C., particularly in the range of from about 200° C. to about 220° C.

It has now been found that, in order to produce a film which is both brittle and processible, heat-setting should be conducted by raising the temperature of the stretched film to a temperature $T_1$ in a first heating zone such that $(T_M - T_1)$ is in the range of from about 5 to about 30° C., preferably in the range of from about 10 to about 20° C., and then raising the temperature of the film to a temperature $T_2$ in a second heating zone such that $(T_M - T_2)$ is in the range of from about 0 to about 10° C., wherein $T_M$ is the peak melting temperature of the polymeric film; and wherein $T_2$ is greater than $T_1$.

It has now been found that the brittleness of the film is determined primarily by the maximum temperature reached by the film during heat-setting, such that a higher temperature confers greater brittleness. However, as the film approaches its melting temperature, the film web starts to melt and becomes unstable. For instance, the film web may start to sag, particularly in the transverse direction. To overcome this problem, the time spent at the higher temperature of the second heating zone should be minimised.

The times which a transverse section of the film spends in the first and second heating zones are defined by $t_1$ and $t_2$, respectively, such that the ratio of $t_1$ to $t_2$ is at least 2:1, preferably at least 5:1, more preferably at least 8:1, and more preferably at least 15:1. In a preferred embodiment, the ratio of $t_1$ to $t_2$ is less than 65:1, preferably less than 50:1. In a particularly preferred embodiment, the ratio of $t_1$ to $t_2$ is the range of about 8:1 to about 50:1.

Since the heat-setting step in the manufacture of polymeric film is generally conducted at a constant line-speed, the ratio of the length of the first heating zone $L_1$ to the length of the second heating zone $L_2$ is at least 2:1, preferably at least 5:1, more preferably at least 8:1, and more preferably at least 15:1. In a preferred embodiment, the ratio of $L_1$ to $L_2$ is less than 65:1, preferably less than 50:1. In a particularly preferred embodiment, the ratio of $L_1$ to $L_2$ is the range of about 8:1 to about 50:1.

It is therefore preferred that the temperature rise in the second heating zone should be effected rapidly. In conventional heat-setting arrangements, the desired temperature of heat-setting is generally reached in a substantially asymptotic manner. According to the present invention, the temperature rise in the second heat-setting zone is achieved in a linear or substantially linear manner. In practice, this is effected by providing a greater intensity of heating in the second heating zone. Thus, in a preferred embodiment, the second heating zone is heated by infrared radiation. The temperature rise in the first heating zone may be effected in a substantially asymptotic manner, for instance the first heating zone may be heated by one or more conventional air convection heater(s).

Once the heat-setting step has been effected, as described above, the film is then cooled.

The cooled film is then passed to the next stage in the process, which is to trim the film edges which had been held by stenter clips in the ovens. This edge-trimming procedure is well-known in film manufacture and, in conventional processes, is performed at ambient temperatures. However, the edge-trimming of the brittle film of the present invention presents particular problems since it has a tendency to fracture or shatter when cut by the edge-trimming knives. It has been found that raising the temperature of the film edges immediately prior to contact with the edge trim knives overcomes this problem. The rise in film temperature need only be effected at the edges of the film, specifically in the regions where the edge-trim knives contact the film, and does not need to be effected across the whole width of the film web. Thus, hot-air blowers may be located immediately prior to the edge trim knives in order to locally heat the edges of the film to a temperature at which it is possible to cut the brittle film without fracture of the film web. In a preferred embodiment, the temperature of the film at this point was raised to approx 50 to 220° C., preferably 100 to 200° C.

Thus, in a further aspect of the invention there is provided a process for the production of a polymeric film comprising a copolyester having an acid component and a diol component, said acid component comprising a dicarboxylic acid and a sulfomonomer containing a sulfonate group attached to the aromatic nucleus of an aromatic dicarboxylic acid, said process comprising the steps of:

(i) melt-extruding a layer of said copolyester;
(ii) stretching the extrudate in at least one direction;
(iii) heat-setting the film by raising the temperature of the stretched film to a temperature $T_1$ in a first heating zone such that $(T_M-T_1)$ is in the range of from about 5 to about 30° C., preferably in the range of from about 10 to about 20° C., and then raising the temperature of the film to a temperature $T_2$ in a second heating zone such that $(T_M-T_2)$ is in the range of from about 0 to about 10° C., wherein $T_M$ is the peak melting temperature of the polymeric film;

wherein $T_2$ is greater than $T_1$; and wherein the times which a transverse section of the film spends in the first and second heating zones are defined by $t_1$ and $t_2$, respectively, such that the ratio of $t_1$ to $t_2$ is at least 2:1, preferably at least 5:1, more preferably at least 8:1, and more preferably at least 15:1.

In a further aspect of the invention, there is provided a polymeric film comprising a copolyester having an acid component and a diol component, said acid component comprising a dicarboxylic acid and a sulfomonomer containing a sulfonate group attached to the aromatic nucleus of an aromatic dicarboxylic acid, obtainable by a process comprising the steps of:

(i) melt-extruding a layer of said copolyester;
(ii) stretching the extrudate in at least one direction;
(iii) heat-setting the film by raising the temperature of the stretched film to a temperature $T_1$ in a first heating zone such that $(T_M-T_1)$ is in the range of from about 5 to about 30° C., preferably in the range of from about 10 to about 20° C., and then raising the temperature of the film to a temperature $T_2$ in a second heating zone such that $(T_M-T_2)$ is in the range of from about 0 to about 10° C., wherein $T_M$ is the peak melting temperature of the polymeric film;

wherein $T_2$ is greater than $T_1$; and wherein the times which a transverse section of the film spends in the first and second heating zones are defined by $t_1$ and $t_2$, respectively, such that the ratio of $t_1$ to $t_2$ is at least 2:1, preferably at least 5:1, more preferably at least 8:1, and more preferably at least 15:1.

The brittleness of the polymeric film is measured primarily in terms of the tensile strength. The test procedure is set out in ASTM D882-88, which provides values of ultimate tensile strength (UTS) and elongation at break (ETB). However, in order to assess brittleness, the interpretation of the results obtained using the procedures of ASTM D882-88 was modified for the following reasons. The inherent brittleness of the films described herein mean that they behave differently from a standard polymeric film when subjected to stress in the ASTM D882-88 test. In particular, at the point where the test sample cannot withstand further stress, the films tend to tear rather then break. The equipment conventionally used to measure UTS and ETB records the stress and strain values at the point when the test sample stops tearing and actually breaks, rather than the stress and strain values at the onset of tearing. As a result, the conventional performance and subsequent data analysis of the D882-88 test procedure provides an artificially low UTS value and a high ETB value for the films described herein. Thus, the data analysis was modified by measuring the stress and strain at the point when the film starts to destruct, i.e. when the film starts to tear. These values for the stress and strain are referred to herein as the ultimate tensile strength at destruction (UTD), and the elongation at destruction (ETD), respectively. These values were obtained from the stress/strain tensile graph (or trace) obtained from the performance of the ASTM D882-88 test by reading the values on the x axis (strain; ETD) and y axis (stress; UTD) of the graph at the point where the tear starts.

The polymeric film produced by the process described herein preferably exhibits a UTD in the machine direction in the range of from about 2 kgf/mm$^2$ to about 15 kgf/mm$^2$, preferably from about 6.5 kgf/mm$^2$ to about 8.0 kgf/mm$^2$. The polymeric film described herein preferably exhibits a UTD in the transverse direction in the range of from about 2.5 kgf/mm$^2$ to about 17 kgf/mm$^2$, preferably from about 7.5 kgf/mm$^2$ to about 9.0 kgf/mm$^2$.

The polymeric film described herein preferably exhibits an ETD in the machine direction in the range of from about 15% to about 180%, preferably from about 80% to about 140%. The polymeric film described herein preferably exhibits an ETD in the transverse direction in the range of from about 5% to about 160%, preferably from about 80% to about 140%.

The polymeric film preferably has a tear initiation value, measured according to ASTM D1004-66, in the range of from about 1.0 kg to about 3.0 kg, preferably from about 1.6 to about 2.4 kg in the machine direction, and from about 1.3 kg to about 2.8 kg, preferably from about 1.8 kg to about 2.3 kg in the transverse direction.

The polymeric film preferably has an Unrestrained Linear Thermal Shrinkage (190° C. for 5 minutes), measured as described herein, in the range of from about −1.5% to about 3.0%, preferably in the range of from about −0.5% to about 1.0% in the machine direction, and in the range of from about 0% to about 5.0%, preferably in the range of from about 1.5% to about 3.0% in the transverse direction. Negative shrinkage values indicate expansion rather than shrinkage.

The polymeric film according to the invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss improvers, prodegradents, flame retardants, UV absorbers, viscosity modifiers and dispersion stabilisers may be incorporated as appropriate. In particular the film may comprise a particulate filler. The filler may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the layer. The presence of an incompatible resin usually results in a voided layer, by which is meant that the layer comprises a cellular structure containing at least a proportion of discrete, closed cells. A dispersing agent may also be incorporated to improve dispersibility of the incompatible resin filler in the layer polymer, in accordance with conventional practice well-known in the art.

Particulate inorganic fillers include conventional inorganic pigments and fillers, and particularly metal or metalloid oxides, such as alumina, silica (especially precipitated or diatomaceons silica and silica gels) and titania, calcined china clay and alkaline metal salts, such as the carbonates and sulphates of calcium and barium. The particulate inorganic fillers may be of the voiding or non-voiding type. By voiding is meant comprising a cellular structure containing at least a proportion of discrete, closed cells. Barium sulphate is an example of a filler which results in the formation of voids. Titanium dioxide may be of the voiding or non-voiding type, dependant upon the particular type of titanium dioxide employed. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the film polymer. Preferred particulate inorganic fillers include titanium dioxide, silica or barium sulphate, or a mixture thereof. The preferred titanium dioxide particles may be of anatase or rutile crystal form.

The particulate inorganic filler should be finely-divided, particularly for films required to have high opacity or high whiteness. The volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm.

The size distribution of the inorganic filler particles is also an important parameter, for example the presence of excessively large particles can result in the film exhibiting unsightly 'speckle', i.e. where the presence of individual filler particles in the film can be discerned with the naked eye. It is preferred that none of the inorganic filler particles should have an actual particle size exceeding 30 µm. Particles exceeding such a size may be removed by sieving processes which are known in the art. However, sieving operations are not always totally successful in eliminating all particles greater than a chosen size. In practice, therefore, the size of 99.9% by number of the inorganic filler particles should not exceed 30 µm, preferably should not exceed 20 µm, and more preferably should not exceed 15 µm. Preferably at least 90%, more preferably at least 95% by volume of the inorganic filler particles are within the range of the volume distributed median particle diameter±0.8 µm, and particularly ±0.5 µm.

Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

The films of the present invention may be optically clear, translucent or opaque.

In one embodiment, the film of the present invention is optically clear, preferably having haze (percentage of scattered visible light) of <20%, preferably <17%, more preferably <6%, more preferably <3.5% and particularly <2%, measured according to the standard ASTM D 1003-61. Typically, the haze may be in the range of 9% to 20%, particularly 12% to 17%. In this embodiment, filler is typically present in only small amounts, generally less than 3%, preferably less than 2%, preferably less than 0.5% and preferably less than 0.2% by weight of the film polymer.

In an alternative embodiment of the invention, the film is opaque and highly filled, preferably exhibiting a Transmission Optical Density (TOD) in the range from 0.2 to 1.75, more preferably 0.25 to 1.5, more preferably from 0.35 to 1.25 and particularly 0.45 to 1.00. The aforementioned ranges are particularly applicable to a 60 µm layer. The film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in an opaque film is preferably in the range from 1% to 30%, more preferably 3% to 20%, particularly 4% to 15%, and especially 5% to 10% by weight, based on the weight of the film polymer.

In one embodiment of the invention, the film comprises an optical brightener. An optical brightener may be included at any stage of the polymer or polymer film production. Preferably, the optical brightener is added to the glycol, or alternatively by subsequent addition to the polyester prior to the formation of the polyester film, e.g. by injection during extrusion. The optical brightener is preferably added in amounts in the range from 50 to 1500 ppm, more preferably 100 to 1000 ppm, particularly 200 to 600 ppm, and especially 250 to 350 ppm by weight, relative to the weight of the polyester. Suitable optical brighteners include those available commercially under the trade names "Uvitex" MES, "Uvitex" OB, "Leucopur" EGM and "Eastobrite" OB-1.

The components of the composition of the film may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

Particularly improved aesthetic appearance of the film occurs when the external surface of the polyester film is matt, preferably exhibiting a 60° gloss value, measured as herein described, of less than 60%, more preferably in the range from 5% to 55%, particularly 20% to 50%, and especially 35% to 45%.

The surface of a white layer preferably exhibits a whiteness index, measured as herein described, in the range from 80 to 120, more preferably 85 to 110, particularly 90 to 105, and especially 95 to 100 units.

The surface of a white film according to the present invention preferably has the following CIE laboratory colour co-ordinate values for L*, a* and b*, measured as herein described. The L* value is suitably greater than 85, preferably in the range from 90 to 100, more preferably 93 to 99, and particularly 95 to 98. The a* value is preferably in the range from −2 to 3, more preferably −1 to 2, particularly 0 to 1.5, and especially 0.3 to 0.9. The b* value is preferably in the range from −10 to 0, more preferably −10 to −3, particularly −9 to −5, and especially −8 to −7. The colour co-ordinate values may be modified by the incorporation of suitable dyes, such as a blue and/or magenta dye(s), into the film-forming polymer. For example a blue dye may be used, preferably at a concentration in the range from 10 to 1000 ppm, more preferably 30 to 500 ppm, particularly 50 to 200 ppm, and especially 100 to 150 ppm, relative to the weight of the polymer. Alternatively, or in addition, a magenta dye may be employed, preferably at a concentration in the range from 2 to 200 ppm, more preferably 4 to 100 ppm, particularly 7 to 50 ppm, and especially 10 to 15 ppm, relative to the weight of the polymer.

The film of the present invention may also comprise an ink-receptive coating and, optionally, a primer layer between the ink-receptive coating and the copolyester film described above. The ink-receptive coating improves the adhesion of ink to the film and increases the range of inks that can be readily applied to the surface. The ink-receptive coating may be any such coating well-known to those skilled in the art. For example, the ink-receptive coating may comprise an acrylic component and optionally a cross-linking component (e.g. melamine formaldehyde). Other ink-receptive coatings well-known in the art comprise cellulose derivatives, such as hydroxypropylcellulose, or other water absorbent polymers. Suitable ink-receptive layers and their use are described in, for example, WO-A-97/37849, WO-A-96/26840 and EP-A-0429179, the disclosures of which are incorporated herein by reference. Receiving layers suitable for receiving an image formed by a conventional electrostatic copying technique, for example a technique using a thermally fusible toner powder, are described in EP-A-0408197 the disclosure of which is incorporated herein by reference.

The polymeric film of the invention may also be metallised by conventional techniques well known in the art, such as disclosed in EP-A-0348062 the disclosure of which is incorporated by reference.

The polymeric film is therefore able to carry information such as, but not limited to, bar codes, holograms, electromagnetic readable devices, and print.

According to a further aspect of the invention, there is provided a security label comprising a polymeric film as described herein which optionally further comprises an adhesive layer which has sufficient adhesive strength to secure the security label to the object to be protected. The adhesive layer may comprise any suitable adhesive known to those skilled in the art, such as a polyurethane-based adhesive. The adhesive layer may be, for example, pressure sensitive ("self-adhesive") or thermally-activated. The label optionally comprises a primer layer or coating between the adhesive layer and the polymeric film described herein in order to promote adhesion of the adhesive layer to the film. The label may also comprise a further layer, adjacent the adhesive layer, comprising a "peel-apart" release film to assist in transporting the film to the point of application without spoiling. The release film may be any such film well-known to those skilled in the art.

According to a further aspect of the invention, there is provided the use of a polymeric film as described herein as an anti-counterfeit or security label.

The following test methods are used to determine certain properties of the polymeric film:

(i) Haze is measured using a Hazegard System XL-211, according to ASTM D 1003.

(ii) 60° gloss value of the film surface is measured using a Dr Lange Reflectometer REFO 3 (obtained from Dr Bruno Lange, GmbH, Dusseldorf, Germany) according to DIN 67530.

(iii) Transmission Optical Density (TOD) of the film is measured using a Macbeth Densitometer TR 927 (obtained from Dent and Woods Limited, Basingstoke, UK) in transmission mode.

(iv) L*, a* and b* colour co-ordinate values (CIE (1976)) and whiteness index of the external surface of a white film according to the invention is measured using a Colorgard System 2000, Model/45 (manufactured by Pacific Scientific) based on the principles described in ASTM D313.

(v) Unrestrained Linear Thermal Shrinkage is measured according to a modified version of ASTM 1204. Thus, the modified test involved no pre-conditioning of the test sample and utilised a test sample which was 25 mm and 300 mm long (instead of a 100 $mm^2$ square).

(vi) Tear initiation is measured according to ASTM D1004-66.

(vii) Ultimate tensile strength at destruction (UTD) and elongation at destruction (ETD) are measured using the ASTM D882-88 test modified as described herein.

Figure 2:
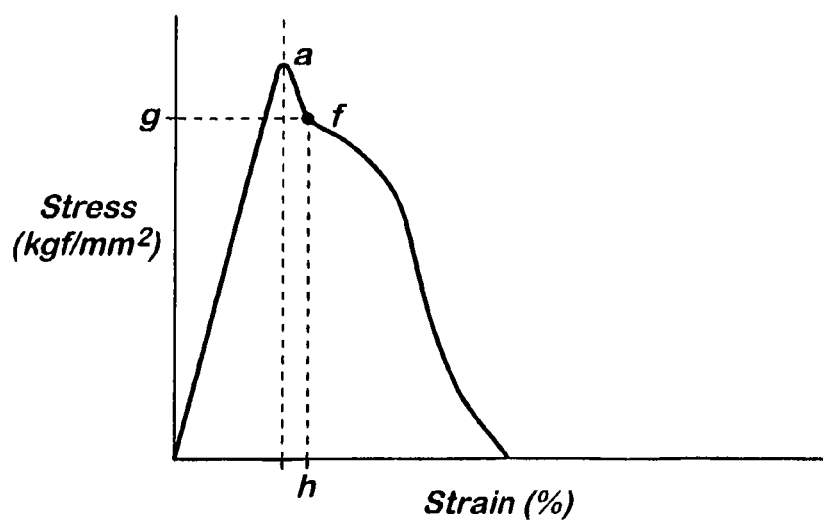
FIG. 2 shows a tensile trace for a brittle film according to the invention.

The point at which the film starts to tear is readily identifiable from the tensile trace and a method of identifying this point is illustrated below with reference to FIGS. 1 and 2, which represent tensile traces for a standard poly(ethylene terephthalate) (PET) film and for a brittle film according to the present invention, respectively. Referring to the figures, as force is applied to the test sample, the stress rapidly rises to a point (the Yield Point) where the sample is no longer elastic, identified as point (a) on the figures. As force is continually applied to the sample, the stress/strain curve decreases to a point where elongation would normally start (point (b) in FIG. 1; point (f) in FIG. 2). For the standard PET sample of FIG. 1, elongation occurs until the sample reaches its breaking point (point (c) in FIG. 1), when the test ends and values for UTS (ultimate tensile strength; point (d)) and ETB (elongation at break; point (e)) are calculated in accordance with ASTM D882-88. For the brittle film of the present invention (FIG. 2), the film starts to tear at point (f), the point where a standard PET film would start to elongate. As force is continually applied to the sample, the stress/strain curve rapidly decreases to zero stress. The UTD (ultimate tensile strength at destruction) and ETD (elongation at destruction) are represented as points (g) and (h) in FIG. 2, respectively.

The invention is further illustrated by means of the following Examples. It will be appreciated that the Examples are provided for the purpose of illustration only and are not intended to restrict the scope of the invention. Modification of detail may be made without departing from the scope of the invention.

EXAMPLES

Example 1

2150 kg of terephthalic acid were reacted with 500 L of ethylene glycol and 680 L of 5-sodium sulphoisophthalic acid in the presence of 1000 ppm of sodium acetate, 250 ppm of tetra-isopropyl titanate and 100 ppm of cobalt acetate to form a very low molecular weight co-polymer in a standard esterification reaction. At the end of direct esterification 250 ppm of phosphoric acid stabiliser were added followed by 300 ppm of antimony trioxide polycondensation catalyst. 23.5 kg of an 18.3% slurry of china clay was also added at this stage. A standard batch polycondensation reaction was performed until the intrinsic viscosity of the co-polymer was about 0.68.

Analysis of the polymer by X-Ray fluorescence confirmed the content of the 5-sodium sulphoisophthalate to be 4 mol %. The amount of china clay in the final polymer was about 0.15%. The peak melting temperature of the polymer was about 220° C.

The copolyester was processed to give biaxially oriented film. Dried pellets of co-polymer were extruded through a slot die and rapidly quenched on a chilled casting drum so as to produce an amorphous extrudate. Orientation was then effected by stretching the amorphous extrudate in a 2-stage process, first in the longitudinal direction and then in the transverse direction. Stretching the film in the longitudinal direction was accomplished between slow and fast rotating rolls, the temperature of the slow rolls being approx 67° C., after which the film was irradiated with infrared radiation to above its glass transition temperature. The film was heated in the pre-heat zone of the stenter oven to about 85° C. and then passed to the stretching zone of the stenter oven at a temperature of about 110° C. for the transverse stretching step. The degree of stretch employed in the longitudinal direction was approximately 3.3 times and the degree of stretch in the transverse direction was approximately 3.6 times the original length.

The biaxially-oriented film was heat-set under dimensional restraint by passing the stretched film through the crystallising section of the stenter oven which comprised a series of three inter-connecting ovens wherein the temperature of the film was raised to 205° C. The first two ovens were approx 3.05 m in length and the third oven was approx 3.40 m in length. In the final section (approx 40 cm) of the third oven, the film was irradiated with infrared radiation. This was achieved by locating three medium-wavelength quartz-covered infrared heaters (obtained from Casso-Solar (Kingswinford, UK); Type C+; operating wavelength range of 2.25 to 6.0 μm; maximum power output of 50 W/inch$^2$ (7.75 W/cm$^2$)) across the film web. The IR heaters were operated at approx 10-15% of their maximum power at an element temperature of 415 to 430° C. In order to achieve a uniform temperature rise across the width of the film web, and therefore a uniform brittleness across the film width, the two heaters at the edge of the film web were operated at an element temperature of 430° C. and the heater in the middle of the film web was operated at an element temperature of 415° C. At this point in the process, the width of the film web was approx 1110 mm, and the line speed was approx 9.8 m/min. The IR radiation section of the heat-setting ovens corresponds to the second heating zone described herein; the remaining portion of the heat-setting ovens corresponds to the first heating zone described herein.

Once the heat-setting operation was completed, the film was cooled in air and then passed to the next stage in the process, which is to trim the film edges which had been held by stenter clips in the ovens. The temperature of the film immediately prior to contact with the edge trim knives was raised. This was effected by locating hot-air blowers immediately prior to the edge trim knives in order to locally heat the edges of the film to a temperature at which it is possible to cut the brittle film without fracture of the film web. In a preferred embodiment, the temperature of the film at this point was raised to approx 50 to 220° C., preferably 100 to 200° C.

The final thickness of the film was approx 50 μm. The film was analysed using the test procedures described herein, with the results shown in the table below. For each test, a sample from the centre of the film was utilised.

| UTD (kg/mm$^2$) | | ETD (%) | | Tear Initiation (kg) | | Shrinkage (%)* | | |
|---|---|---|---|---|---|---|---|---|
| MD | TD | MD | TD | MD | TD | MD | TD | Haze |
| 6.53 | 8.01 | 86.1 | 106.3 | 1.61 | 1.85 | −0.28 | 2.32 | 16.4 |

*190° C. for 5 minutes

The invention claimed is:

1. A polymeric film comprising a copolyester having an acid component and an aliphatic diol component, said acid component comprising an aromatic dicarboxylic acid and a sulfomonomer containing a sulfonate group attached to the aromatic nucleus of an aromatic dicarboxylic acid, wherein said polymeric film has an ultimate tensile strength at destruction (UTD), as measured herein, in the range of from about 2 kgf/mm$^2$ to about 15 kgf/mm$^2$ in the machine direction, and from about 2.5 kgf/mm$^2$ to about 17 kgf/mm$^2$ in the transverse direction, and wherein the polymeric film has an Unrestrained Linear Thermal Shrinkage in a range from −1.5% to 3.0% in the machine direction and in a range from 0% to 5.0% in the transverse direction.

2. The polymeric film according to claim 1, obtained by a process comprising the steps of: (i) melt-extruding a layer of said copolyester; (ii) stretching the extrudate in at least one direction; (iii) heat-setting the film by raising the temperature of the stretched film to a temperature T$_1$ in a first heating zone such that (T$_M$−T$_1$) is in the range of from 5 to 30° C., and then raising the temperature of the film to a temperature T$_2$ in a second heating zone such that (T$_M$−T$_2$) is in the range of from 0 to 110° C., wherein T$_M$ is the peak melting temperature of the polymeric film; wherein T$_2$ is greater than T$_1$; and wherein the times which a transverse section of the film spends in the first and second heating zones are defined by t$_1$ and t$_2$, respectively, such that the ratio of t$_1$ to t$_2$ is at least 2:1.

3. The polymeric film according to claim 1 which has a tear initiation value, as measured herein, in the range of from 1.0 kg to 3.0 kg in the machine direction, and from 1.3 kg to 2.8 kg in the transverse direction.

4. A security label comprising a polymeric film as set out in claim 1 and further comprising an adhesive layer.

5. The security label according to claim 4 wherein the adhesive layer comprises a pressure sensitive adhesive or a thermally-activated adhesive.

6. The security label according to claim 4 wherein when the label, if adhered to a packaged object via the adhesive layer, fractures if an attempt is made to remove the label from the packaged object.

7. A method of making a packaged object tamper-evident, comprising a step of adhering a polymeric film according to claim 1 to the packaged object.

8. The polymeric film according to claim 1 wherein said diol component comprises ethylene glycol.

9. The polymeric film according to claim 1 wherein the copolyester consists of the acid component and the aliphatic diol component, and wherein the acid component consists of the aromatic dicarboxylic acid and the sulfomonomer.

10. The polymeric film according to claim 1 wherein said dicarboxylic acid is terephthalic acid.

11. The polymeric film according to claim 1 wherein the amount of said sulfomonomer is from 2 to 10 mol % based on the weight of the copolyester.

12. The polymeric film according to claim 1 wherein the amount of said sulfomonomer is from 2 to 6 mol % based on the weight of the copolyester.

13. The polymeric film according to claim 1 wherein said sulfonate group is a sulfonic acid salt.

14. The polymeric film according to claim 1 wherein said sulfonate group is a sulfonic acid salt of a Group I or Group II metal.

15. The polymeric film according to claim 1 wherein the aromatic dicarboxylic acid of said sulfomonomer is isophthalic acid.

16. The polymeric film according to claim 1 wherein said sulfomonomer is 5-sodium sulphoisophthalic acid or 4-sodium sulphoisophthalic acid.

* * * * *